Patented June 8, 1926.

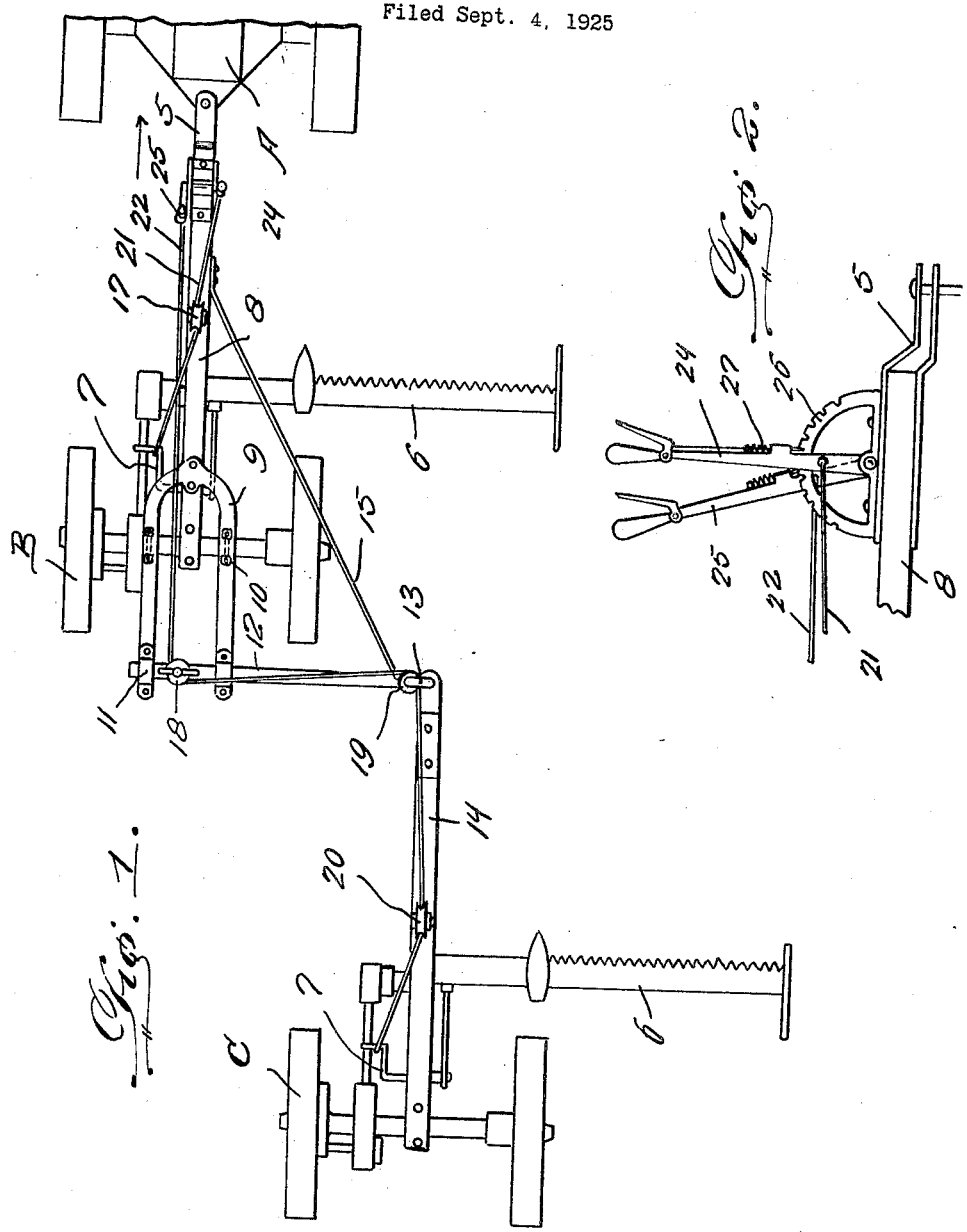

1,587,591

UNITED STATES PATENT OFFICE.

EDMUND KOCOUREK, OF HAZEN, ARKANSAS.

MOWER ATTACHMENT.

Application filed September 4, 1925. Serial No. 54,502.

The present invention relates to mowers, and more particularly to means for lifting the sickles of a plurality of mowers, one trailing behind the other in offset relation.

The growing tendency in the operation of mowers is to hinge or connect two or three together in trailing and offset relation behind a tractor. It has been the general practice to have an operator upon each one of these trailing mowers to control the lifting of the sickles. Such practice, however, is not economical. The preferred practice is to remotely control the sickles from a single point, preferably adjacent the tractor.

It, therefore, is one of the important objects of this invention to control the sickles of the mowers from a common point adjacent the tractor.

Another important object of the invention is to connect a plurality of mowers in trailing offset relation to a tractor and one another.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view showing the arrangement of the tractor and the mowers and, Figure 2 is an enlarged detail elevation showing the control levers.

Referring to the drawing in detail it will be seen that A designates a tractor having the usual hinge 5. Letters B and C denote mowers in trailing relation to the tractor A, and in offset relation to each other. The mowers B and C include among other elements sickles 6 and means 7 for raising the sickles. A draw bar 8 extends forwardly from the mower B and is attached in the usual manner to the hinge 5. A U-shaped yoke 9 has its intermediate portion fixed to the draw bar 8 adjacent its rear end, and the legs of this yoke extend rearwardly, having their intermediate portions fixed to the axle by clips 10. Clips 11 are disposed on the extremities of the yoke 9 and receive a transverse draw bar 12 terminating to one side of the mower B, and having a hinge 13 at its ends to which is attached the forward end of the draw bar 14 of the mower C. A brace rod 15 is disposed between the extremity of the transverse draw bar 12, and an intermediate portion of the draw bar 8. A pulley 17 is mounted on an intermediate portion of the draw bar 8. A pulley 18 is mounted on the transverse draw bar 12 between the sides of the yoke 9. A pulley 19 is mounted at the extremity of the transverse draw bar 12. A pulley 20 is mounted on an intermediate portion of the draw bar 14. A cable 21 is trained over the pulley 17, and is attached to the lifting means 7. A cable 22 is trained over the pulleys 18, 19 and 20 and is attached to the raising means 7 of the mower C. Levers 24 and 25 are pivotally mounted on the forward end of the draw bar 8, and have attached thereto respectively cables 21 and 22. Suitable notched quadrants 26 are associated with the levers for receiving the pawl mechanism 27 mounted on the levers.

From the above detailed description it will be seen that I have provided an exceedingly simple structure whereby the mowers may be trailed in offset relation to each other behind a tractor. It will further be seen that simple and efficient means have been provided for raising the sickle bars of the mowers from a common point in close proximity to the tractor, whereby a single person may operate the tractor and control the mowers.

It is thought that the construction, operation, and advantages of my invention will now be clearly understood without a more detailed description thereof. The present embodiment of the invention has been disclosed merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what I claim as new is:—

1. In combination, a mower including a draw bar, a yoke having its intermediate portion rigidly fixed to the draw bar and extending rearwardly therefrom, a transverse draw bar rigidly attached to the extremities of the yoke, a second mower including a draw bar pivotally engaged with the extremity of the transverse draw bar.

2. In combination, a mower including a draw bar, a yoke having its intermediate portion rigidly fixed to the draw bar and extending rearwardly therefrom, a transverse draw bar rigidly attached to the extremities of the yoke, a second mower including a draw bar pivotally engaged with the extremity of the transverse draw bar, a sickle associated with each mower, means for operating the sickles, levers pivoted on the first draw bar, and cables leading from the levers to said means.

In testimony whereof I affix my signature.

EDMUND KOCOUREK.